United States Patent

[11] 3,549,118

| [72] | Inventor | Arthur W. Bluder<br>Clearwater, Fla. |
|---|---|---|
| [21] | Appl. No. | 777,038 |
| [22] | Filed | Nov. 19, 1968 |
| [45] | Patented | Dec. 22, 1970 |
| [73] | Assignee | ABC Packaging Machine Corporation<br>Largo, Fla.<br>a corporation of Florida |

[54] DIAPHRAGM OPERATED PIVOTED GLUE VALVE
5 Claims, 2 Drawing Figs.

[52] U.S. Cl. ................................................ 251/58,
251/61, 251/303
[51] Int. Cl. ............................................. F16k 31/165
[50] Field of Search ........................................ 251/58,
303, 298; 137/510; 251/61, 61.3

[56] References Cited
UNITED STATES PATENTS

| 258,432 | 5/1882 | Keith ........................... | 251/303 |
|---|---|---|---|
| 1,518,984 | 12/1924 | Kien ............................ | 137/510 |
| 1,618,815 | 2/1927 | Cory et al. ..................... | 251/61.3X |
| 2,099,244 | 11/1937 | Temple ......................... | 137/505.47X |
| 2,361,084 | 10/1944 | Canetta ......................... | 251/61X |
| 2,598,417 | 5/1952 | Niemann ....................... | 251/303 |
| 3,339,881 | 9/1967 | Palmer .......................... | 251/58 |

FOREIGN PATENTS

| 469,509 | 11/1950 | Canada ......................... | 251/61.3 |

*Primary Examiner*—Arnold Rosenthal
*Attorney*—Newton, Hopkins & Ormsby

ABSTRACT: This invention relates to a valve assembly capable of providing a regulated source of fluid pressure with provision for remote on-off actuation when used in conjunction with a regulated air pressure supply, via suitable air controls, and is ideally suited for controlling, measuring and dispensing a wide range of fluid materials or plastic adhesive material such as glue. The valve portion of the assembly is composed of a tilt member controlled by movement of a diaphragm under pressure.

PATENTED DEC22 1970

3,549,118

INVENTOR.
ARTHUR W. BLUDER
BY Newton, Hopkins
& Ormsby
Attorneys

DIAPHRAGM OPERATED PIVOTED GLUE VALVE

SUMMARY

It is an object of this invention to provide a fluid-operated valve assembly that is normally closed.

Another object of this invention is to provide a valve assembly which includes a tiltable valve element that is actuated by applying fluid pressure to a diaphragm.

A further object of this invention is to provide a valve assembly wherein the valve housing is an integral unit.

A still further object of the invention is to provide a valve assembly which includes a tiltable valve element, a valve-seating spring, a valve element actuator and a valve actuator restore spring operatively associated with each other without any interconnecting means.

Another object of this invention is to provide a valve assembly including a tiltable valve element formed with integral projections to insure proper seating of the valve element.

A further object of this invention is to provide a valve assembly extremely compact, simple of construction and assembly and economical to produce.

To the accomplishment of the foregoing and related ends and objects, the following description sets forth in detail one approved means of carrying out the invention. Such disclosed means are not meant to be limiting inasmuch as it constitutes but one of the various ways in which the principles of the invention may be applied.

In the drawings wherein like reference numerals indicate like parts in the various views:

DESCRIPTION OF THE ILLUSTRATIVE EMBODIMENT

Figure 1:
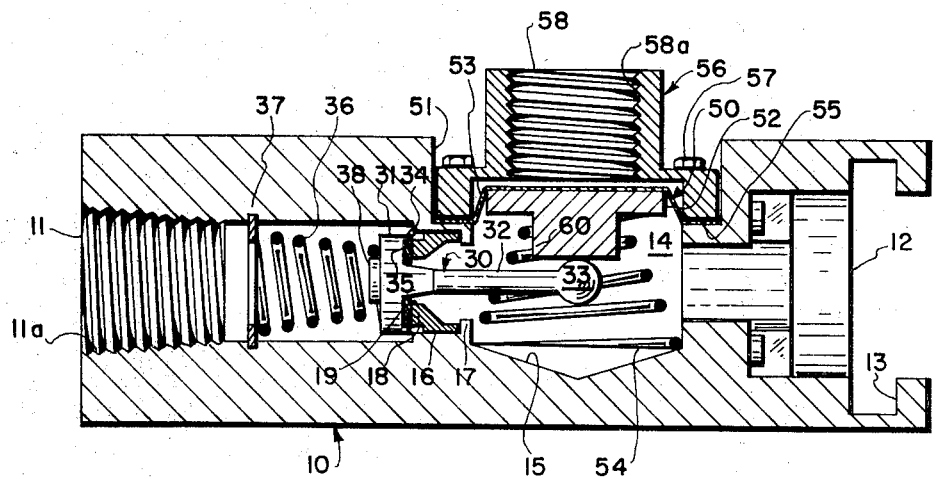
FIG. 1 is a longitudinal sectional view of the valve assembly with the valve element in the closed position.

Referring now to FIG. 1, a valve assembly is shown having a valve housing 10, a valve element 30, and a valve actuator 50.

The valve housing includes inlet and outlet ports or passages 11, 12, respectively. The inlet passage 11 is provided with a threaded portion, 11a, adapted to be connected to a fluid supply line (not shown). The outlet passage 12 is adapted to be connected by a conventional swivel fitting 13 to an appropriate discharge head (not shown). A valve chamber 14 interconnects the inlet and outlet passage and includes a valve seat surface 16 coaxial with said passages 11, 12. Fitted in the valve seat surface 16 and abutting against an annular housing projection 17 is a valve seat collar 18 having an opening 19 formed therein.

The valve element 30 includes an integral valve base portion 31 and a valve stem portion 32. The valve stem 32 is substantially smaller in diameter than the valve collar opening 19 and extends therethrough to a point substantially midway of the valve chamber 14. The extended end of valve stem 32 is provided with a spherical-shaped tip 33. The valve base 31 includes an annular projection 34 surrounding the valve seat collar 18 to insure proper alignment of the valve base 31 in the closed position. A gasket element 35 is fitted inside annular projection 34 and surrounding valve stem 32 to insure proper seating of the valve base against valve collar 18. Valve element 30 is yieldably held in a closed position by a compression spring 36 which is trapped between a removable snapring 37 and the rear surface of valve base 31. A rearwardly extending projection 38 is formed on the rear surface of valve base 31 and fits into spring 36 to maintain spring 36 in proper alignment with valve base 31.

A valve actuator means 50 is provided in an opening 51 which extends into valve chamber 14. The valve actuator 50 includes a plunger 52, diaphragm 53 and valve actuator restore spring 54. The diaphragm 53 is fitted into opening 51 and is held therein by being clamped between an annular shoulder 55 and an air control fitting 56. Bolts 57 are used to secure fitting 56 to valve housing 10. Fitting 56 includes a first opening 58 provided with a threaded portion 58a adapted to be connected to an air control line (not shown) and a second opening 59 of larger diameter coaxial with opening 58.

Plunger 52 is of a smaller diameter than opening 59 and is held therein by restore spring 54 which is trapped between the valve chamber bottom 15 and plunger 52. Formed on plunger 52 is a projection 60 which extends into actuator restore spring 52. Diaphragm 53 passes between plunger 52 and fitting 56 to close the opening 51 between valve chamber 14 and air control opening 58. The dimensions of plunger 52 with projection 60 are detailed so that the plunger will fill the space between valve stem tip 33 and diaphragm 53 when the valve is in a closed position (as shown in FIG. 1).

Figure 2:
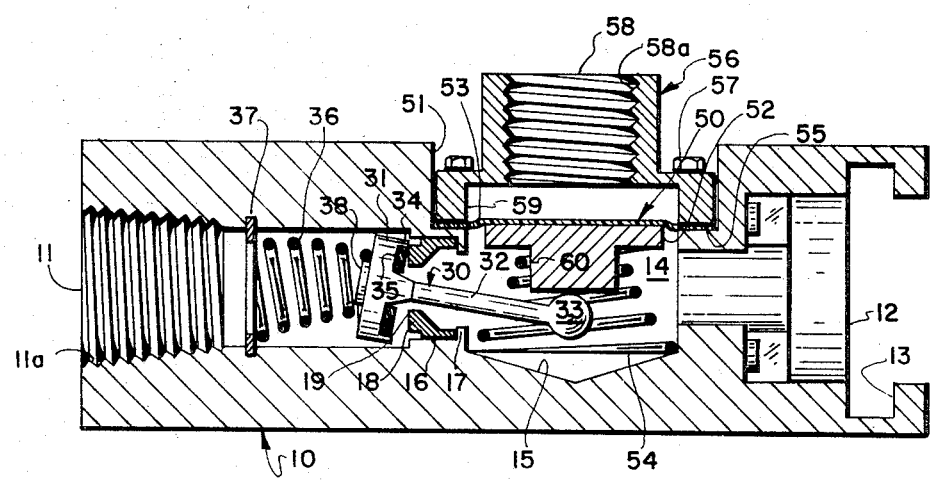
FIG. 2 is a view similar to FIG. 1 showing the valve element in an open position.

Plunger 52 is actuated by increasing pressure on diaphragm 53 to overcome spring 54. Movement of diaphragm 53 downwardly is transmitted through plunger 52 to valve stem 32, to thereby tilt the valve base 31 to an open position, (as shown in FIG. 2) to allow fluid to pass from inlet 11 through opening 19 and valve chamber 14 to outlet 12. Decreasing the pressure on diaphragm 53 will allow plunger 52 to be returned upwardly to home position (FIG. 1) by valve actuator restore spring 54 thus allowing valve spring 36 to return valve element 30 to a closed position.

It will now appear that there has been provided an improved valve assembly that attains the several objects set forth above in a thoroughly practical and efficient manner.

As different embodiments of the invention are possible and as many changes may be made in the embodiment disclosed, all without departing from the scope of the invention, it is to be understood that the foregoing should be interpreted as illustrative and not in a limiting sense.

I claim:

1. A valve assembly adapted to deliver fluid under pressure comprising:
   a. a valve housing of generally cylindrical form having axially aligned inlet and outlet passages;
   b. a valve chamber located in the housing and aligned with the inlet and outlet passages;
   c. a valve opening in the housing between the inlet passage and the valve chamber;
   d. a valve seat means around the peripheral edge of said valve opening;
   e. a valve element located in said inlet passage and adapted to abut against the valve seat to close the valve opening;
   f. a spring located in the inlet passage and engaging the valve to urge it toward closed position;
   g. a diaphragm closing one sidewall portion of the valve chamber;
   h. a plunger mounted on the diaphragm and formed with a projection extending into the valve chamber at right angles to the axis of the inlet and outlet openings;
   i. means forming a closed chamber on the side of the diaphragm opposite the valve chamber;
   j. means to admit fluid to the said closed chamber for causing the diaphragm to move the plunger inwardly of the chamber;
   k. a valve stem of a diameter substantially less than that of the opening between the inlet passage and the valve chamber rigidly connected to the valve, extending through the said opening and terminating in a generally spherical portion located centrally of the valve chamber, in a position to be laterally engaged by the said plunger projection when it is moved inwardly by the diaphragm to tilt the valve to open position; and
   l. a spring located between the plunger and the opposite wall of the valve chamber and urging the plunger and diaphragm outwardly of said chamber, so that, when no pressure is exerted on the diaphragm from outside the valve chamber, the valve will be closed under the action of the spring in the inlet passage.

2. A valve assembly as in claim 1 in which the upstream end of the spring located in the inlet passage is supported by a snapring.

3. A valve assembly as in claim 1 in which the valve seat means includes an annular collar projecting into the inlet passage and spaced from the wall thereof, and the valve element includes an annular projection surrounding said collar, to insure proper alignment of the valve in closed position.

4. A valve assembly as in claim 3 in which a gasket is fitted inside the annular projection of the valve element.

5. A valve assembly as in claim 4 in which the diaphragm is located in a flanged opening in a side of the valve chamber which is recessed into the wall of the housing, and the means to supply fluid to the outer side of the diaphragm includes a conduit having an annular flange formed integrally therewith and spaced outwardly therefrom, said flange being received in the recess and engaging the edge of the diaphragm, and means for clamping the diaphragm between the flanges of the conduit and the valve chamber opening.